May 16, 1939.  A. W. RIECK ET AL  2,158,667
SLICING DEVICE
Filed Oct. 29, 1936  3 Sheets-Sheet 3
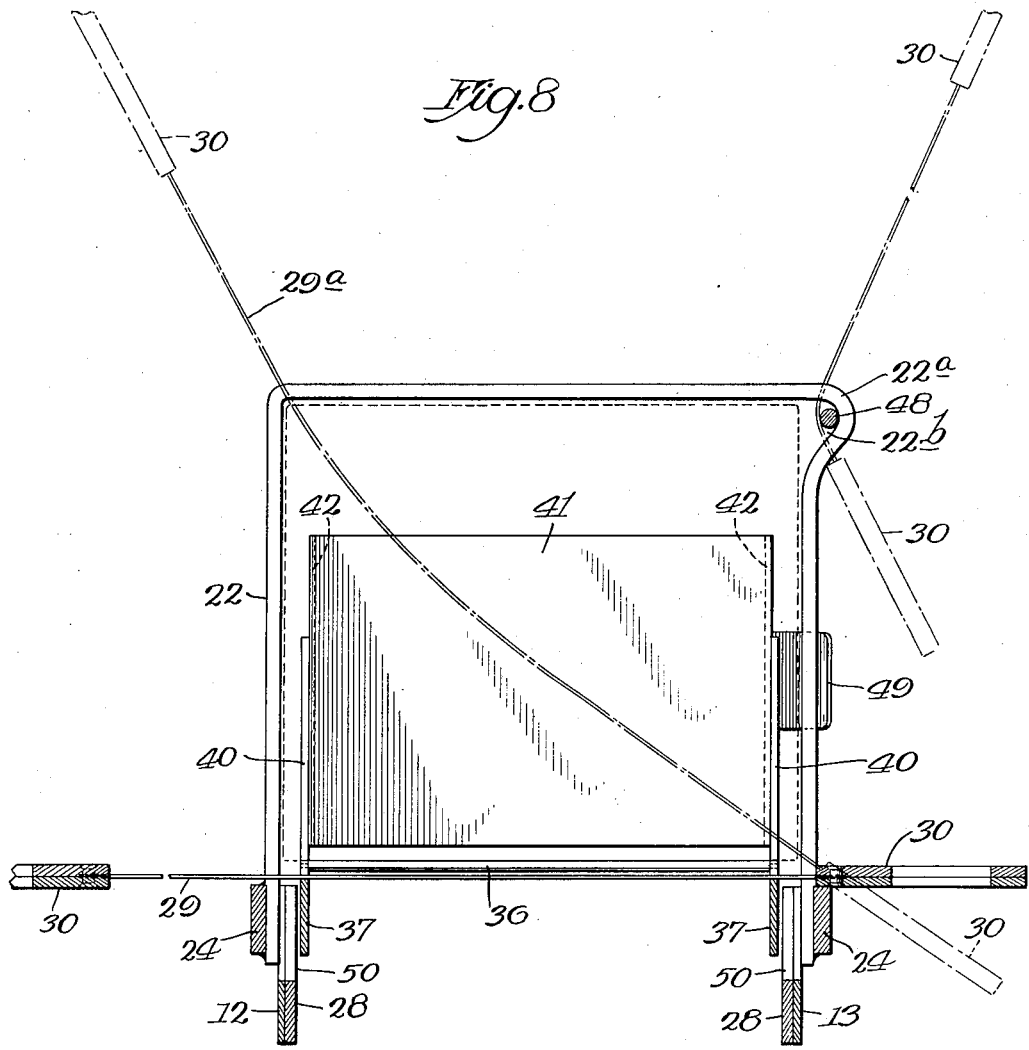
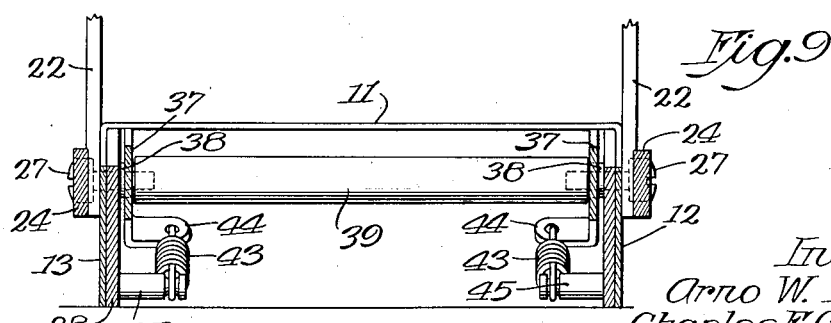

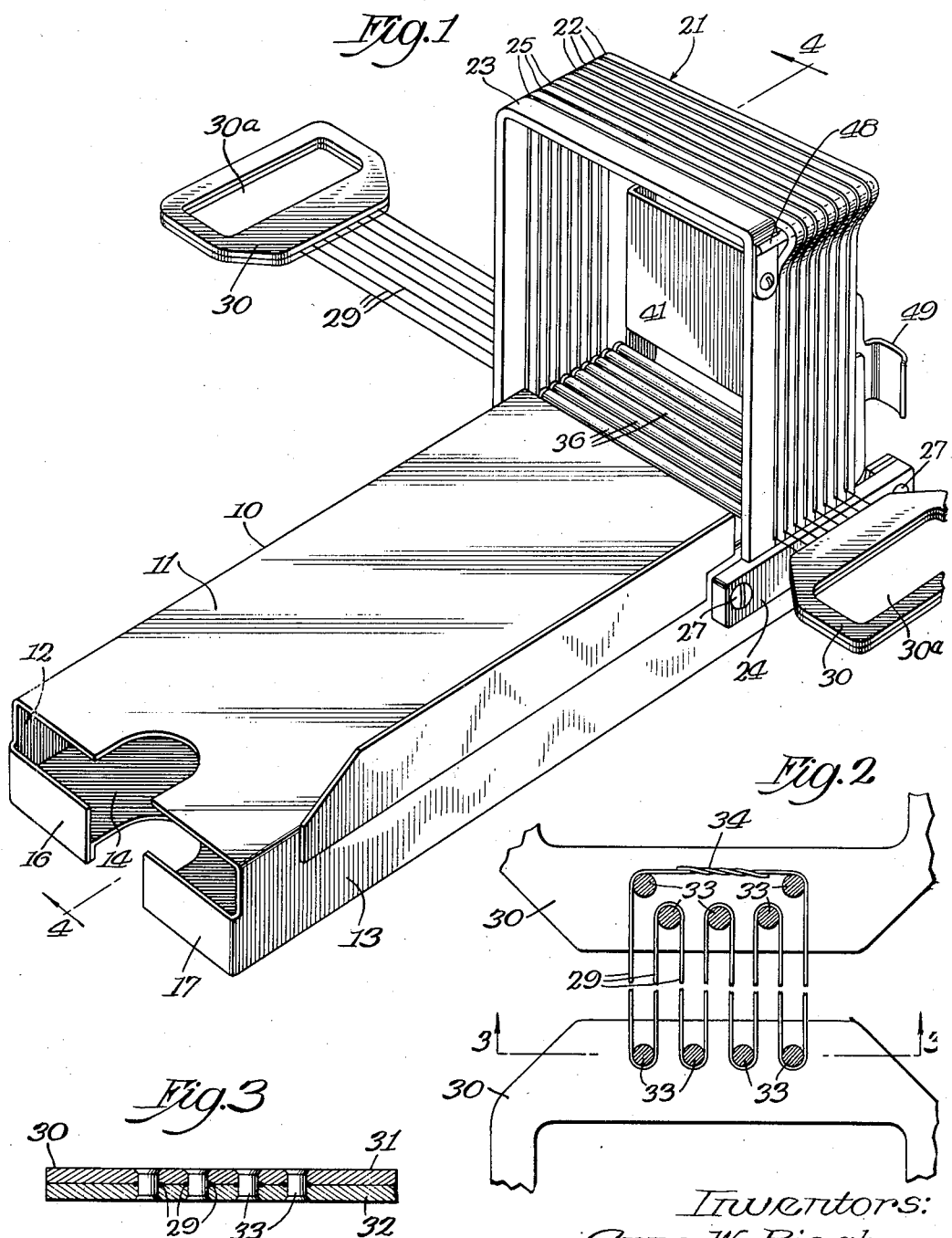

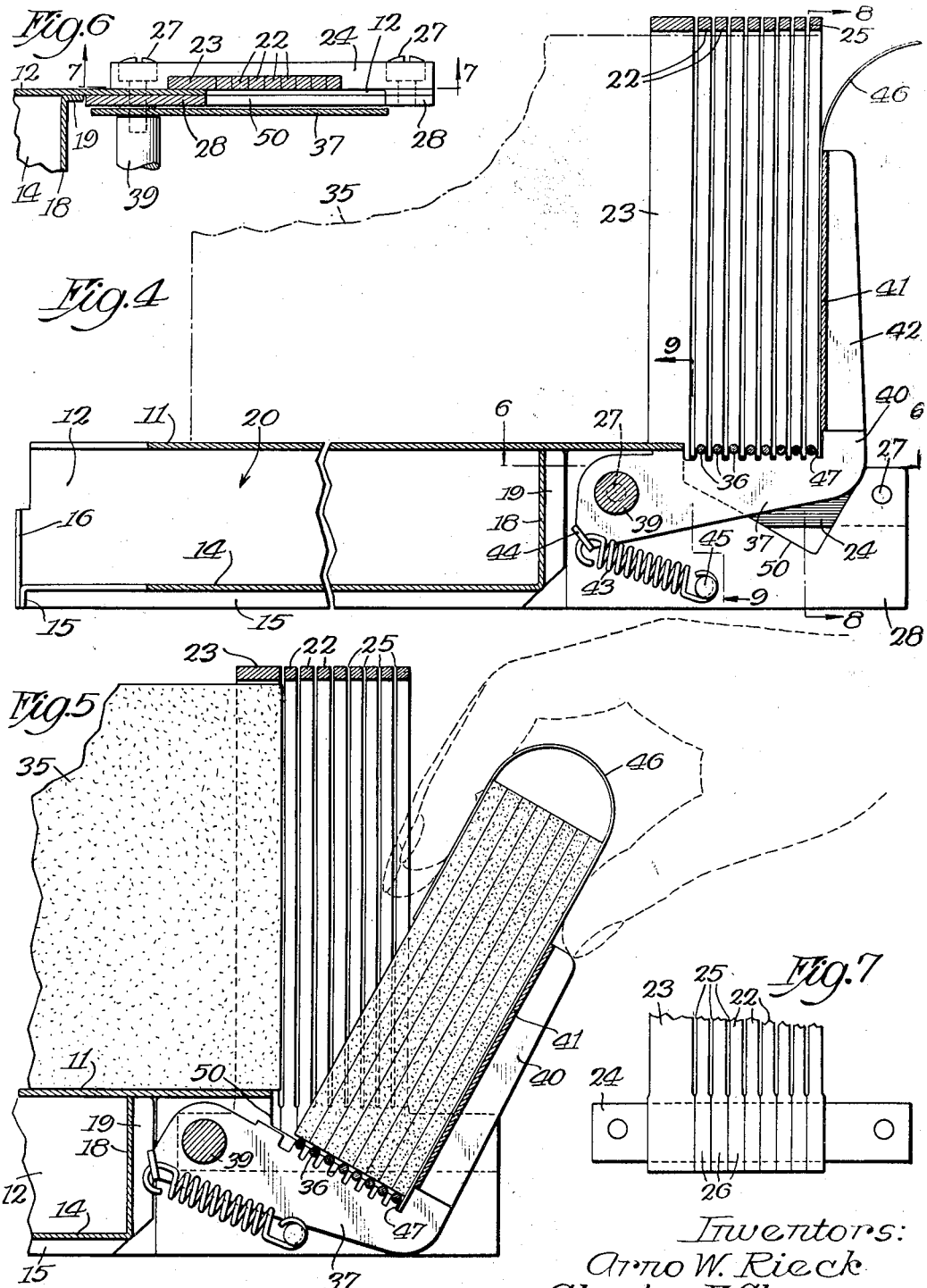

Patented May 16, 1939

2,158,667

UNITED STATES PATENT OFFICE 2,158,667

SLICING DEVICE

Arno W. Rieck, Charles F. Chapman, and Kurt Wambach, Chicago, Ill., assignors to Kraft-Phenix Cheese Corporation, Chicago, Ill., a corporation of Delaware Application October 29, 1936, Serial No. 108,144

15 Claims. (Cl. 31—20)

This invention relates to slicing devices and more particularly to a device especially adapted for slicing cheese and other food products of similar characteristics.

The main objects of the invention are to provide a slicing device which will facilitate the cutting of loaf cheese or other similar material into slices of predetermined thickness; to provide a device for the purposes indicated which may be easily operated by hand and which is simple and durable and inexpensive to construct and maintain; to provide a device of the character indicated which may be easily cleaned and maintained in a sanitary condition; and to provide a device which will facilitate the slicing of such materials as cheese and wrapping of the sliced material without requiring direct contact between the cheese and person's hand, and which will facilitate the application of a wrapper to the sliced material, thereby tending to promote the sale of the product as an incident to the sanitary method of handling the same.

Other objects and advantages of the invention will be understood by reference to the following specification and accompanying drawings (3 sheets), wherein there is illustrated a slicing device embodying a selected form of the invention and designed especially for the slicing of cheese from commercial rectangular loaves.

In the drawings:

Fig. 1 is a perspective showing the improved device;

Fig. 2 is a fragmentary plan section showing a detail of construction of certain cutting apparatus;

Fig. 3 is a section on the line 3—3 of Fig. 2;

Fig. 4 is a section on the line 4—4 of Fig. 1;

Fig. 5 is a section corresponding to a portion of Fig. 4, but showing certain parts in changed position;

Fig. 6 is a section on the line 6—6 of Fig. 4;

Fig. 7 is a section on the line 7—7 of Fig. 6, and

Figs. 8 and 9 are sections, respectively, on the lines 8—8 and 9—9 of Fig. 4.

The device illustrated comprises a base 10 which, in this instance, is made of sheet metal bent to provide a supporting surface or top 11 and depending side flanges 12 and 13. The side flanges 12 and 13 constitute, in effect, legs for supporting the top member 11 at an elevation above a table or counter top on which the device may be placed. A sheet metal bottom plate 14 provided with side and end flanges 15 is secured through the agency of its depending flanges 15 to the side flanges 12 and 13 of the base and to front walls 16 and 17 which are formed integrally with the base 10 in the form of narrow endwise extensions from the respective side walls 12 and 13. The bottom member 14 is also provided with a back wall 18 having end flanges 19. The flanges 19 may also be secured to the side walls of the base. The bottom member 14 with its end portion 18 cooperates with the base structure to form a receptacle 20 within the base. The receptacle 20 is adapted to hold a supply of waxed paper or other wrapping sheets adapted to be used on the cheese or other material which is sliced with the device.

At one end of the base 10, there is provided a cage-like structure 21 adapted to position a loaf of cheese or other material on the base and to hold such loaf in proper position during the slicing operation. The cage-like structure comprises a plurality of inverted, substantially U-shaped members respectively designated 22, all of substantially the same narrow width and a wider, substantially inverted U-shaped member 23. The members 22 and 23 have their lower or free ends secured respectively to bars 24 by welding or otherwise. The members 22 are spaced from each other and from the member 23 sufficiently to provide narrow guideways 25 between them. In order to insure proper spacing, the lower ends of the members 22 and 23 are subjected to a flatening operation which incidentally effects widening thereof as indicated at 26 in Fig. 7. Such an operation may be performed rapidly and inexpensively like any conventional stamping operation and it may be carried out in such a manner that the resulting width of the flattened ends will be sufficiently increased to automatically space the members as indicated. If desired, the widened ends may, of course, be subjected to a grinding operation to more accurately finish them to a predetermined width. The widened ends are preferably welded to the bars 24 with the result that the members 22 and 23 become, in effect, a unitary structure of sufficient rigidity for the purpose of the slicing device.

The unitary cage-like structure 21 is mounted in proper position on the base 10 by means of screws or other fastening devices designated 27 which extend through the ends of the bars 24 and threadedly engage either or both the side flanges 12 and 13 and a reinforcing element 28 positioned on the inside of each of the flanges 12 and 13.

The cutting device proper comprises, in this instance, a plurality of substantially parallel spaced wire strands designated 29 which extend between handle members designated 30. The wire strands 29 are preferably formed from a single length of wire which extends back and forth between the two handle members 30, substantially as indicated in Fig. 2. By reference to Figs. 1, 2 and 3, it will be seen that the handle members 30 comprise a pair of plate like members 31 and 32 of like size and shape disposed in mutually overlapping relation. The wire element is bent around rivets or other fastening devices designated 33 which unite the plates forming each handle, so as to produce the parallel spaced strands 29. As best shown in Figs. 2 and 3, the fastening devices 33 are of such diameter and so located that the wire element when bent around them as indicated will provide the said parallel spaced strands in the desired spaced relation. The two ends of the single wire may be twisted together as indicated at 34 so as to form a closed loop of the wire and to resist pulling out of the wire from between the two plates 31 and 32. The plates 31 and 32 are preferably of a relatively soft metal, for example, aluminum, and they are clamped together with sufficient force to effect embedment of the wire 29 in the metal, as clearly indicated in Fig. 3. Hence it will be apparent that the wire is tightly gripped between the plates forming the handles while also being anchored thereby through the agency of the fastening rivets 33. As indicated especially in Fig. 1, the handle members may be formed with an opening designated 30ª which serves to facilitate manipulation of the cutting device.

The wires 29 of the cutting device are respectively received in the guideways 25 formed in the cage-like structure 21. The guideways being in properly spaced parallel relation may thus serve to guide the wires in movement transversely of a loaf of material position on the base 10 with an end portion thereof within the cage-like structure.

The end portion of a loaf of cheese or the like indicated in broken lines at 35 in Fig. 4, and full lines in Fig. 5, is supported by means of a plurality of round rods 36 which are spaced apart to correspond with the members 22 and so as to provide spaces between them corresponding with the guideways 25. The rods 36 are carried, either rotatably or fixedly, in bracket members designated 37 which are pivotally mounted adjacent inner ends thereof on reduced diameter end extensions 38, 38 of a rod 39. The opposite ends of the rod 39 are engaged by the innermost fastening screws 27 which are somewhat longer than the screws 27 at the outer ends of the bars 24. The outer ends of the brackets 37 have upwardly extending legs 40 which are connected by a plate 41. The connecting plate 41 may, if desired, be formed integrally with the bracket arms 40 or it may be formed as shown, as an independent element suitably secured as by welding or soldering to the arms 40 through the agency of side flanges 42. Springs such as designated 43 stretched between ears 44 projecting from the inner ends of the brackets 37 and pins 45 suitably anchored to the base structure serve to yieldingly hold the end supporting structure in normal operative position, as illustrated in Fig. 4. The end plate 41 serves, of course, to limit the insertion of the cheese loaf or the like through the cage-like structure so as to properly position the end portion of the loaf to be sliced with respect to the slicing mechanism.

In employing the device to slice cheese, the sales person places the loaf of cheese on the base 10 in position to have an end portion thereof inserted into the cage-like structure 21. A wrapping sheet designated 46 in Figs. 4 and 5, is removed from the receptacle 20 and positioned over the end member 41. The width of the wrapper 46 is preferably such that it substantially corresponds to the width of the cheese loaf.

The lower end of the wrapper 46 is positioned in grooves designated 47 in the brackets 37 so that the sheet may readily be properly positioned so as to be adapted to be wrapped around the sliced material as will presently appear. Before the cheese loaf is inserted into the cage-like structure, the cutting wire device is positioned with its wires 29 in the spaces between the rollers 36 carried by the brackets 37. Thereupon the loaf is moved endwise to position its forward end portion within the cage-like structure and against the wrapping sheet 46 and end wall 41.

The wire-cutting device is initially arranged with one of its handles disposed closely adjacent the cage structure, its wires stretched to substantial straightness whereby the other handle is spaced substantially from the cage structure as indicated in Fig. 1. Thereupon the outwardly spaced end of the cutting device is grasped and pulled upwardly. The end of the cutting structure which is positioned closely adjacent the cage structure is not handled but is permitted to, or caused to move only as an incident to movement imparted to the cutting wires from the other end thereof. As shown in Fig. 8, during the initial upward movement of the extended end of the cutting device, the other end remains substantially fixed except for rocking movement incident to the changed angular position of the cutting wires. When the cutting wires reach a position approximately as indicated at 29ª in Fig. 8, the further upward and crosswise movement thereof results in an upward sliding movement of the then lower end of the cutting structure. Thus it will be seen that the cutting wires effect their cutting as an incident to both lateral and longitudinal movement of the wires relative to the cheese loaf through which the wires are pulled. The foregoing explanation of the movement of the wires is, of course, only typical since it may vary slightly with different grades of cheese or other material having different densities. In some instances the upward sliding movement of the initially stationary end may start sooner or later than indicated. Generally speaking, it does appear that there is at first a cutting operation incident to only lateral movement of the cutting wires and subsequently a cutting action incident to simultaneous lateral and longitudinal movement of the wires. This action has been found to afford an unusually easily operated slicing arrangement. In order that the wires 29ª may clear the sliced material upon completion of the slicing operation, the members 22 of the cage-like structure are provided with offset portions designated 22ª forming recesses 22ᵇ adjacent one corner of the cage structure. A rod 48 extends transversely of the members 22 and is located within the recesses 22ᵇ for preventing complete removal or disassociation of the cutting wires from the cage-like structure. The rod 48 may be removably secured to the member 23 in any suitable manner, for example, as illustrated in Fig. 1.

When the slicing operation is completed, the end supporting structure comprising the brackets 37 and end member 41 may be tilted downwardly and outwardly to a position such as illustrated in Fig. 5. To facilitate such tilting, the end structure is provided with a lip or the like indicated at 49 in Figs. 1 and 8. The sliced cheese is, of course, supported on the bars 36 of the end structure and on the end member 41 thereof, so that when the said end structure is adjusted to the position indicated in Fig. 5, the cheese slices carried thereby are substantially removed from within the cage structure. In such position the wrapping sheet 46 may be folded over the upper portion of the cheese slices as indicated in Fig. 5, and the slices removed without direct contact of the operator's hands with the cheese. Hence, the device facilitates the sanitary handling of the cheese. It should also be noted that in commercial practice, cheese loaves are wrapped with suitable material, such as metallic foil, so that the cheese is not directly contacted with the hands even when placing the loaf on the slicing device.

As best shown in Figs. 4, 5, and 8, the side flanges 12 and 13 of the base and the reinforcing elements 28 are cut away as indicated at 50, so as to provide clearance for the sliced cheese when it is carried to accessible position as illustrated in Fig. 5.

The arrangement described provides for the handling and slicing of cheese without incidentally producing crumbs and with but little tendency to cause adherence between any of the cheese and the device. Hence, cleanliness of the device is easily maintained. Also, the device is preferably made of stainless and rustless metals which may be easily cleaned merely by a bath of hot water. The various parts may be manufactured by inexpensive stamping operations so that the cost of production may be maintained at a low figure.

Changes in the described construction may be made without departing from the spirit of the invention, the scope of which should be determined by reference to the following claims, the same being construed as broadly as possible consistent with the state of the art.

We claim:

1. In a slicer of the class described, means for supporting a loaf of material to be sliced, and a flexible cutting wire associated with said supporting means so as to be bodily movable both longitudinally and transversely, said supporting means having a groove therein for receiving said cutting wire for initial disposition transversely of and under a loaf positioned on said supporting means, said cutting wire being movable transversely through the loaf initially by lateral movement of the wire and subsequently by simultaneous lateral and longitudinal movement of the wire.

2. In a slicing device of the class described, a support for a loaf of material to be sliced, a floating wire adapted to be forced through such loaf, and means for guiding the wire during its cutting movement comprising a pair of inverted U-shaped members having their respective lower ends connected together in fixed relation so as to maintain said members in predetermined spaced relation for guiding the wire between them, and said united lower ends being connected respectively to the opposite sides of said supporting means.

3. In a slicing device of the class described, means for supporting a loaf of material to be sliced, a plurality of cutting wires adapted to be simultaneously moved transversely through the loaf in spaced relation to each other, means for guiding said wires comprising a plurality of inverted U-shaped members, the same having a transverse dimension corresponding to the thickness of slices to be cut, and means for maintaining said members in predetermined spaced relation so as to form guideways between them for said cutting wires, said means comprising a pair of bars respectively associated with the adjacent ends of said members, the ends of said members being secured to said bars, and said bars being secured to said base so as to fixedly position said guiding means relative to the supporting means.

4. In a slicing device of the class described, the combination of a base for supporting a loaf of material to be sliced, a plurality of substantially parallel wires adapted to be moved transversely through a loaf of material disposed on said base so as to slice the same, means for guiding said wires comprising a plurality of inverted U-shaped members arranged in substantially parallel spaced relation so as to form guideways therebetween through which said wires are adapted to be moved, and means for mounting said members in fixed relation to the base comprising a pair of bars respectively associated with the opposite ends of the U-shaped members, said U-shaped members having their opposite ends widened sufficiently to provide interengaging sides adapted to space the unwidened portions of the members sufficiently to form said guideways therebetween, said widened ends being fixedly secured to said bars, and the bars being removably united to said base.

5. In a slicing device of the class described, the combination of a base for supporting a loaf of material to be sliced, a plurality of substantially parallel cutting wires adapted to be moved through an end portion of a loaf disposed on said base so as to simultaneously cut a plurality of slices from such loaf end portion, means for guiding said cutting wires, and means for supporting said loaf end portion comprising a bottom part adapted to receive the bottom of said loaf end portion and an end part adapted to engage the end of the loaf to position said end portion with respect to said guiding means, said bottom and end parts being mounted on said base for downward and outward rocking movement so as to move the sliced loaf end portion to an accessible position clear of said guiding means.

6. In a slicing device of the class described, the combination of a base for supporting a loaf of material to be sliced, a plurality of substantially parallel, spaced cutting wires adapted to be moved transversely through an end portion of such loaf to slice the same, means for guiding said wires during their cutting movement, said means comprising a plurality of inverted, substantially U-shaped members disposed in transversely spaced relation so as to form guideways therebetween for said wires, said members having their lower ends secured to said base so as to be thereby maintained in predetermined fixed relation to the base, means for supporting the end portion of the load to be sliced comprising a bottom part adapted to engage the bottom surface of the load and constituting, in effect, a continuation of said base, said bottom part having a plurality of grooves extending therethrough for initially receiving said cutting wires, said grooves registering respectively with said guideways so as to permit said wires to be moved upwardly from the grooves into said guideways, and an end part rigidly connected with said bottom part for engaging the end of the loaf of material to position the same with respect to said guiding means, said bottom part and said end part being mounted on said base for downward and outward movement so as to be adapted to move the sliced material to accessible position clear of said guiding means.

7. In a slicing device of the class described, the combination of a base for supporting a loaf of material to be sliced, a plurality of substantially parallel, spaced cutting wires adapted to be moved transversely through an end portion of such load to slice the same, means for guiding said wires during their cutting movement, said means comprising a plurality of inverted, substantially U-shaped members disposed in transversely spaced relation so as to form guideways therebetween for said wires, said members having their lower ends secured to said base so as to be thereby maintained in predetermined fixed relation to the base, means for supporting the end portion of the loaf to be sliced comprising a bottom part adapted to engage the bottom surface of the loaf and constituting, in effect, a continuation of said base, said bottom part having a plurality of grooves extending therethrough for initially receiving said cutting wires, said grooves registering respectively with said guideways so as to permit said wires to be moved upwardly from the grooves into said guideways, and an end part rigidly connected with said bottom part for engaging the end of the loaf of material to position the same with respect to said guiding means, said bottom part and said end part being mounted on said base for downward and outward movement so as to be adapted to move the sliced material to accessible position clear of said guiding means, and means for yieldably maintaining said loaf end supporting means in normally operative supporting position.

8. In a slicing device of the class described, a base for supporting a loaf of material to be sliced, a receptacle formed in said base for containing a supply of wrappers, a plurality of cutting wires adapted to be moved through an end portion of a loaf of material positioned on said base so as to cut said end portion into slices, means for guiding said wires during such cutting movement, and a support for said loaf end portion including an end member adapted to engage the loaf end to position the same with respect to said guide means, said end supporting means being provided with means for positioning one end portion of a wrapper in overlying relation to the engaged end of said loaf, said end supporting means being mounted for downward and outward movement so as to move the sliced material to accessible position clear of said guiding means, so as to facilitate folding of another portion of said wrapper around one side of the sliced loaf and over the opposite face thereof to thereby permit handling of the sliced material without direct contact with the material.

9. In a slicing device of the class described, the combination of a base for supporting a loaf of material to be sliced, a plurality of substantially parallel floating wires adapted to be moved through a loaf positioned on said base so as to cut a portion of the loaf into slices, a plurality of aligned, relatively spaced, inverted, substantially U-shaped members for guiding said wires, the lower ends of said guiding members being secured to said base, means for initially receiving said wires below the level of the bottom surface of a loaf supported on said base, said wires being adapted to be moved upwardly through said loaf, and means for preventing removal of said wires from assembled relation with said guiding means.

10. In a slicing device of the class described, the combination of a base for supporting a loaf of material to be sliced, a plurality of substantially parallel floating wires adapted to be moved through a loaf positioned on said base so as to cut a portion of the loaf into slices, a plurality of aligned, relatively spaced, inverted, substantially U-shaped members for guiding said wires, the lower ends of said guiding members being secured to said base, means for initially receiving said wires below the level of the bottom surface of a loaf supported on said base, said wires being adapted to be moved upwardly through said loaf, and removable means extending transversely of said guide members and across the spaces therebetween for preventing removal of said wires from assembled relation with said guiding means.

11. In a slicing device of the class described, the combination of a base for supporting a loaf of material to be sliced, a plurality of substantially parallel floating wires adapted to be moved through a loaf positioned on said base so as to cut a portion of the loaf into slices, a plurality of aligned, relatively spaced, inverted, substantially U-shaped members for guiding said wires, the lower ends of said guiding members being secured to said base, means for initially receiving said wires below the level of the bottom surface of a loaf supported on said base, said wires being adapted to be moved upwardly through said loaf, and removable means extending transversely of said guide members and across the spaces therebetween for preventing removal of said wires from assembled relation with said guiding means, said U-shaped members having aligned recesses formed therein for receiving said transversely extending means outside of the space within said guiding members adapted to receive the loaf of material to be sliced.

12. In a slicing device of the class described, a plurality of substantially parallel, transversely spaced wires adapted to be moved through a loaf of material to be sliced, and means for maintaining said wires in said parallel relation comprising end members respectively associated with the opposite ends of the wires, each of said end members comprising a pair of plate elements, the same being secured together in face to face relation by means of transversely extending fastening devices, said fastening devices being of such transverse dimension and so positioned as to be adapted to properly space the wires, the latter constituting a single wire bent around certain of said fastening devices, substantially as described.

13. In a slicing device of the class described, a plurality of substantially parallel, transversely spaced wires adapted to be moved through a loaf of material to be sliced, and means for maintaining said wires in said parallel relation comprising end members respectively associated with the opposite ends of the wires, each of said end members comprising a pair of plate elements, the same being secured together in face to face relation by means of transversely extending fastening devices, said fastening devices being of such transverse dimension and so positioned as to be adapted to properly space the wires, the latter constituting a single wire bent around certain of said fastening devices, and said plates being clamped together with sufficient force to effect embedment of the wires in the plates, substantially as described.

14. In a slicing device of the class described, a plurality of substantially parallel, transversely spaced wires adapted to be moved through a loaf of material to be sliced, and means for maintaining said wires in said parallel relation comprising end members respectively associated with the opposite ends of the wires, each of said end members comprising a pair of plate elements, the same being secured together in face to face relation by means of transversely extending fastening devices, said fastening devices being of such transverse dimension and so positioned as to be adapted to properly space the wires, the latter constituting a single wire bent around certain of said fastening devices, the said plates being provided with handle-forming extensions to facilitate manipulation of the cutting device, substantially as described.

15. A slicer of the class described comprising a support for positioning a loaf of material to be sliced, a cutting wire, said wire being free of fixed attachment to said support and being adapted to be initially positioned transversely of one face of the loaf to be sliced, and means for guiding movement of said wire transversely through the loaf, said wire having a handle at one end and having stop means at its other end for engaging said guide means to prevent endwise withdrawal of the wire from its initial position, said stop means slidably engaging said guide means so as to permit said wire to move bodily laterally through said loaf.

ARNO W. RIECK.
CHARLES F. CHAPMAN.
KURT WAMBACH.

CERTIFICATE OF CORRECTION.

Patent No. 2,158,667.  May 16, 1939.

ARNO W. RIECK, ET AL.

It is hereby certified that error appears in the printed specification of the above numbered patent requiring correction as follows: Page 3, second column, lines 66 and 68, claim 6, and page 4, first column, line 13, claim 7, for the word "load" read loaf; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.